United States Patent [19]

Kapuscinski et al.

[11] Patent Number: 5,374,364

[45] Date of Patent: Dec. 20, 1994

[54] MULTIFUNCTION VISCOSITY INDEX IMPROVERS

[75] Inventors: Maria M. Kapuscinski, Carmel; Nicholas Benfaremo, Wappingers Falls; Robert T. Biggs, Walden, all of N.Y.

[73] Assignee: Texaco Inc., White Plains, N.Y.

[21] Appl. No.: 115,839

[22] Filed: Sep. 3, 1993

[51] Int. Cl.$^5$ ............................................ C10M 149/00
[52] U.S. Cl. ................................. 252/47; 252/52 R; 252/58; 525/244; 525/279; 525/286; 525/291; 525/292; 525/317

[58] Field of Search ................ 525/286, 285, 244, 279, 525/292, 317, 291; 252/47, 51.5 A, 52 R, 58

[56] References Cited

U.S. PATENT DOCUMENTS 4,780,228 10/1988 Gardiner et al. ............... 252/51.5 A Primary Examiner—Prince Willis, Jr.
Assistant Examiner—Cephia D. Toomer
Attorney, Agent, or Firm—George J. Darsa

[57] ABSTRACT

Multifunctional viscosity index improvers for lubricating oils containing an EPM or EPDM polymer with pendant thiazoline units.

11 Claims, No Drawings

MULTIFUNCTION VISCOSITY INDEX IMPROVERS

BACKGROUND OF THE INVENTION

This invention relates to a novel multi-functional lubricant additive which is a dispersant and antiwear viscosity index (VI) improver additive when employed in a lubricating oil composition.

It is well known to those skilled in the art, that hydrocarbon lubricating oils must be formulated by addition of various additives to improve their properties.

In the case of lubricating oils, typified by those employed in railway, automotive, aircraft, marine etc., service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, antiwear properties, etc.

It is, therefore, an object of this invention to provide an additive system which imparts to lubricating oils these improved properties of viscosity index, dispersancy, antiwear and oxidation stability properties. Other objects will be apparent to those skilled in the art.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this polymer type of oil.

U.S. Pat. No. 3,522,180 discloses a method for the preparation of an ethylene-propylene copolymer substrate effective as a viscosity index improver for lubricating oils.

U.S Pat. No. 4,089,794 discloses ethylene copolymers derived from ethylene and one of more ($C_3$ to $C_{28}$) alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graph monomer of C-vinyl-pyridine or N-vinylpyrrolidone to provide a dispersant VI improver for lubricating oils.

U.S. Pat. No. 4,820,776 discloses lubricants and fuel oils of improved properties containing ethylene-propylene copolymer derived with N-vinyl pyrrolidone and phenothiazine.

U.S. Pat. No. 4,320,019 discloses a multipurpose lubricating additive prepared by the reaction of an interpolymer of ethylene and a ($C_3$–$C_8$) alpha-monoolefin with an olefinic carboxylic acid acylating agent to form an acylating reaction intermediate which is then reacted with an amine.

U.S. Pat. No. 4,764,304 discloses a lubricating oil dispersant VI improver composition containing an additive prepared by the reaction of an olefin copolymer and an unsaturated isocyanate to form reactive intermediate which is then reacted with heterocyclic amines.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxylamine and finally reacted with an alkaryl sulfonic acid.

The disclosures in the forgoing patents which relate to VI improvers and dispersants for lubricating oils, namely U.S. Pat. Nos. 3,522,180, 4,089,794, 4,137,185, 4,144,181, 4,146,489, 4,320,019, 4,340,689, 4,357,250, 4,382,007, 4,820,776, and 4,764,304 are incorporated herein by reference.

An object of this invention is to provide a novel derivatized polymer composition which imparts viscosity index improving, dispersant and antiwear activity to lubricating oil compositions.

Still another object of this invention is to provide a multi-functional lubricant additive effective for imparting viscosity index, dispersant and antiwear properties to a lubricating oil composition.

SUMMARY OF THE INVENTION

The present invention provides a process for making dispersant/antiwear VI improvers based on ethylene-propylene copolymers containing pendant groups with incorporated thiazoline units. The synthesis involves a grafting reaction of unsaturated monomers such as maleic anhydride, glycidyl methacrylate (GMA) or isocyanato ethyl methacrylate (IEM) to incorporate reactive groups such as an anhydride, an epoxide or an isocyanate pendant reactive groups onto a polymer followed by capping reaction of these groups with 2-amino-2-thiazoline.

This derivatized polymer is prepared by grafting reactive groups onto olefin copolymer such as ethylene-propylene copolymer (EPM) or ethylene-propylene diene terpolymer (EPDM) to form a reactive intermediate which is then reacted with an amine substituted thiazoline compounds. The following reactions describe the process for preparing the derivatized polymer.

The following procedure is used to make the new multifunctional VI improvers in a two-step process. First, an unsaturated monomer is grafted onto polymer under elevated temperatures with addition of a free radical initiator. The grafting reaction is followed by reaction with amine. The following reactions illustrate the process of invention:

1. Grafting reaction

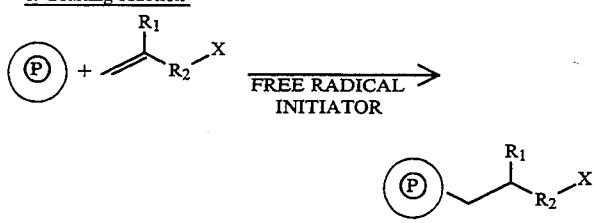

wherein P is a polymer selected from the group consisting of ethylene propylene copolymer, ethylene propylene diene terpolymer, hydrogenated styrene-butadiene copolymer, styrene hydrogenated isoprene or butadiene copolymer, and hydrogenated isoprene polymer; $R_1$ is a hydrogen or an organic linear, cyclic or heterocyclic, and aromatic or heteroaromatic group composed of hydrocarbon and/or one or more atom of oxygen, nitrogen, sulfur or phosphorus; and $R_2$ is an organic linear, cyclic or heterocyclic, and aromatic or heteroromatic unit composed of hydrocarbon and/or one or more atom of oxygen, nitrogen; X is an anhydride, an epoxide, an isocyanate, an azlactone, a chloride, a ketone, an aldehyde or an ester group.

2. Capping reaction

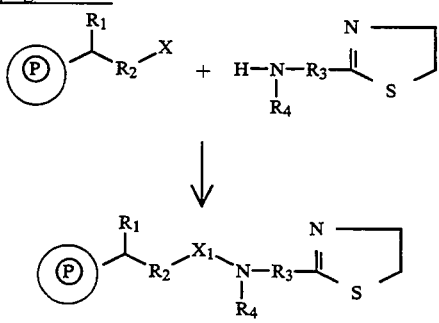

$R_3$ is a linear, cyclic, heterocyclic or heteroaromatic group optionally containing one or more atom of oxygen, nitrogen, sulfur or phosphorus; and $R_4$ is hydrogen or a linear, cyclic, heterocyclic or heteroaromatic group optionally containing one or more atom of oxygen, nitrogen, sulfur or phosphorous.

$X_1$ is a unit derived from X.

The novel reaction product of the invention preferably is prepared using ethylene-propylene copolymer (EPM) or ethylene-propylene diene terpolymer (EPDM) as a polymer base, isocyanoethyl, methacrylate or glycidyl methacrylate as a reactive agent and amino-thiazoline as a functionalizing agent.

The lubricant additive of the present invention comprises an oil of lubricating viscosity and an effective amount of the novel reaction product. The lubricating oil will be characterized by having viscosity index improver, dispersancy and antiwear properties. The methods of preparation are also contemplated.

DESCRIPTION OF THE INVENTION

This invention as discussed briefly above, is directed to a polymer comprising an oil-soluble, substantially linear, carbon-carbon backbone polymer bearing functional and units thereon, derived from an unsaturated monomer containing methacrylate reactive groups such as glycidyl maleic anhydride, isocyanatoethyl or vinyl azlactone and amines containing thiazoline units such as 2-amino-2-thiazoline.

The charge polymer which may be employed in the practice of the present process of this invention may include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from a monomer containing the grouping

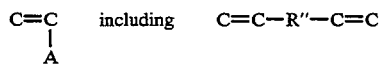

wherein A may be a hydrogen, hydrocarbon such as alkyl, aryl (particularly phenyl) etc., —OOCR typified by acetate or less preferred acyloxy (typified by —OOCR), halide, epoxy etc. R" may be divalent hydrocarbon typified alkylene, alkarylene, cycloalkylene, arylene, etc.

The polymer or copolymer substrate employed in the novel additive of the invention may be prepared from ethylene and propylene or it may be prepared from ethylene and a higher olefin within the range of $C_3$ to $C_{10}$ alpha-monoolefins. The polymer or copolymer substrate may be also prepared from isoprene, styrene or butadiene.

More complex polymer substrates often designated as interpolymers may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4cyclohexadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 5-ethylidene-2norbornene.

The polymer and copolymers prepared from the above mentioned monomers having short and long branches or star shape structure may also be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40–90 mole %, preferably 55–80 mole %, say 59 mole %, the remainder being derived from propylene.

The number average molecular weight $\overline{M}_n$ of the EPM copolymers which may be employed may be about 5,000 to about 1,000,000, preferably about 20,000 to about 200,000, and most preferably about 80,000. The molecular weight distribution may be characterized by $\overline{M}_w/\overline{M}_n$ of less than about 15, preferably 1.2–10, say 2.2.

When the charge polymer is ethylene-propylene-diene terpolymer (EPT or EPDM), it may be formed by copolymerization of ethylene, propylene, and diene monomers. The diene monomer is commonly a non-conjugated diene typified by dicyclo-pentadiene; 1.4-hexadiene; ethylidene norbornene or vinyl norbornene. Polymerization is effected under known conditions generally comparable to those employed in preparing the EPM products. The preferred terpolymers contain units derived from ethylene in amount of 40–90 mole %, preferably 50–65 mole %, say 59 mole % and units derived from propylene in an amount of 20–60 mole %, preferably 30–50 mole %, say 41 mole % and units derived from diene third monomer in amount of 0.2–15 mole %, preferably 0.3–3 mole %, say 0.5 mole %. The molecular weight $\overline{M}_n$ of the terpolymers may typically be about 5,000 to about 500,000, preferably about 20,000 to about 200,000, and most preferably about 80,000. Molecular weight distribution $\overline{M}_w/\overline{M}_n$ of the useful polymers is typically less than 10, preferably 1.8–6, say about 3.0.

It is a feature of the present process that the additive is prepared in a two-step process. In the first step a graft reactive monomer is grafted in the presence of a free radical initiator. In the second step, an amine substituted thiazoline is reacted with the pendant reactive groups of the said polymer.

THE GRAFT FUNCTIONAL MONOMER

It is a feature of the process of this invention that the graft reactive monomers which may be employed (within a polymeric configuration) may be characterized by the presence of units containing an ethylenically unsaturated carbon-carbon an double bond and an anhydride, an epoxide, an isocyanate, an aldehyde, chlorine or an azlactone group. Although the graft monomer may contain more than one ethylenically unsaturated carbon-carbon double bond or reactive group in a preferred embodiment it may contain one of each. Graft monomers containing more than one ethylenically unsaturated carbon-carbon double bond are much less preferred because of the high probability of cross-linking during subsequent reaction.

According to the present invention, the following graft functional monomers may be used:
maleic anhydride
glycidyl methacrylate
allyl glycidyl ether
isocyanatoethyl methacrylate
croton aldehyde
vinyl azlactone
vinyl benzyl chloride It is a feature of the process of this invention that the graft reactive monomer may be grafted onto carbon-carbon backbone polymers.

THE GRAFTING REACTION

In the practice of the process of this invention, 100 parts of charge EPM or EPT (EPDM) may be added to 100–1000 parts, say 60–300 parts of diluent-solvent. Typical diluent-solvent may be a hydrocarbon solvent such as mineral oil, n-hexane or n-heptane. Preferred solvent may be a commercial hexane containing principally hexane isomers or a commercial mineral grafting oil. Reaction mixture may then be heated under nitrogen to reaction conditions of 60° C. –180° C., preferably 150° C. –170° C., say 155° C. When n-hexane or other low boiling solvent is used, reaction is carried out in pressure reactor at 15–300 psig, preferably 180–220 psig, say 200 psig.

A graft monomer, typically glycidyl methacrylate is admitted in an amount of about 1–40 parts, preferably 2 to 5 parts. There is also added a free radical initiator in solution in grafting solvent. Typical free radical initiators, may include dicumyl peroxide, di-t-butyl peroxide, benzoyl peroxide, di-isopropyl peroxide, azobisisobutyro-nitrile, etc. The solvent is preferably the same as that in which the EPM or EPT is dissolved. The initiator may be added in amount of 0.2–20 parts, preferably 0.6 to 3.0 parts. The preferred free radical initiator is a dicumyl peroxide (DICUP).

The grafting reaction is carried out at a temperature at least as high as the decomposition temperature of the initiator, typically 150°–160° C. or higher, during which time bonding of the graft reactive monomer onto the base EPM or EPT polymer occurs.

The product graft polymer may be characterized by the presence of pendant reactive groups bonded to the polymer backbone thorough the residue of the graft monomer.

Typically the graft product polymer may by contain 0.1–20, say 0.4 units derived from graft monomer per 1000 carbon atoms of the charge backbone polymer.

THE AMINE REACTANT

In practice of the present process, the graft polymer bearing pendant reactive groups may be reacted with an amine containing thiazoline units.

The amine substituted thiazoline may be characterized by the following formula:

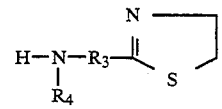

where:
$R_3$ is a linear, cyclic, heterocyclic or heteroaromatic group optionally containing one or more atom of oxygen, nitrogen, sulfur or phosphorus; and
$R_4$ is hydrogen or a linear, cyclic, heterocyclic or heteroaromatic group optionally containing one or more atom of oxygen, nitrogen, sulfur or phosphorous. The amine which may be employed in this invention is 2-amino-2-thiazoline.

THE AMIDIZATION REACTION

Amidization may be carried out by adding the graft polymer containing reactive groups to a reaction vessel together with inert-diluent solvent. In the preferred embodiment, reaction may be carried out in the same solvent and in the same reaction medium as that in which the polymer is dissolved.

An amine, typically 2-amino-2-thiazoline is added to the reaction vessel. The amount of amine added is preferably 0.1–5 moles, say 1.2 moles per mole of reactive group bonded to the polymer or reactive functional monomer charged. Typically this may correspond to 0.05–0.5 moles, preferably 0.008 to 0.18 moles of amine per 100 gram (g) of polymer.

The amidization reaction is carried out over 0.1–20 hours, say 4 hours at 60° C.–300° C., say 200° C. with agitation. For ease of handling, the final product may be diluted to form a solution of 4–20 parts, oil such as a SUS 100 oil typified by SNO-100.

It is a feature of this invention that the so-prepared polymer solution in oil may find use in lubricating oils as multifunctional additive (e.g. viscosity index improvers which provide dispersancy and antiwear properties, etc.) when present in effective amount of about 1.0 to about 20 wt %, preferably 3–15 wt %, preferably about 9 wt %.

Lubricating oils in which the multifunctional additives of this invention may find use may include automotive, aircraft, marine, railway, etc., oils; oils used in spark ignition or compression ignition; summer or winter oils, etc. Typically the lubricating oils may be characterized by a b.p. of about 570° F. to about 660° F., preferably 610° F.; an e.p. of about 750° F. to about 1200° F., preferably 1020° F.; an API gravity of about 25 to about 31 preferably about 29.

A typical lubricating oil in which the polymer of this invention may be present may be a standard SAE 5W-30 hydrocarbon motor oil formulation having the composition as set forth below in Table I.

TABLE I

| | Wt % |
|---|---|
| Base oil | 82 |
| -Viscosity Index Improver (additive of this invention) (10 w % ethylene-propylene copolymer in 90% inert oil) | 9 |
| -Standard Additive Package: Polyisobutenyl (M1290)$_n$ succinimide (dispersant); calcium sulfonate (detergent); Zinc dithiophosphate (anti-wear); di-nonyl diphenyl amine (anti-oxidant); 4,4'-methylene-bis (2,6-di-t-butyl phenol) (antioxidant) | 9 |

Use of the additive of this invention makes it possible to readily increase the viscosity index by 25–40 units, say 35 units and to obtain improved ratings on the tests measuring the dispersancy of the system. The viscosity index is determined by ASTM Test D-445.

The present invention comprises making dispersant and antiwear VI improvers by derivatizing hydrocarbon polymers such as ethylene-propylene copolymer (EPM), or ethylene-propylene-diene terpolymer (EPDM) with, e.g., graft reactive monomer and an amine substituted thiazoline.

Addition of the above invention additives, to a lubricating oil, may be facilitated by use of a concentrate containing about 1 to about 20 wt. %, preferably about 4 to about 14 wt % of polymer.

The tests and analysis used, according to the present invention, are provided below.

TESTS AND ANALYSIS

1. Dispersancy

The sample is blended into a formulated oil, not containing a dispersant, to form 10.0 wt. % viscosity index improver solution. That blend is tested for dispersancy in the prototype VE Test. In this test, the turbidity of an oil containing an additive is measured after heating the test oil to which has been added a standard blow-by. The result correlates with dispersancy and is compared to three standards (Excellent, Good, and fair) tested simultaneously with the test sample. The numerical rating decreases with an increase in dispersant effectiveness. Results around 190 indicate that the additive does not provide dispersant activity.

2. Antiwear Properties

Antiwear performance of a new VI improver were determined by Four-Ball Wear Test (MS-82-79, ASTM D-2266, ASTM4172). The VI improver solutions in formulated oil, having Kinematic Viscosity at 100° C. around 16 cSt were evaluated.

In this test four balls are arranged in an equilateral tetrahedron. The lower three balls are clamped securely in a test cup filled with lubricant and the upper ball held by a chuck which is motor driven causing the upper ball to rotate against the fixed lower balls. Load is applied in an upward direction through a weight/lever arm system. Heaters allow operation at elevated oil temperatures. The test speeds available for each tester are 600 rmp, 1200 rmp and 1800 rpm. Results are reported as average scar diameter (mm).

The amount of amino-thiazoline incorporated onto the OCP in the two-step process is determined by IR-analysis of isolated rubber. The rubber is isolated from solution by multiple precipitation using cyclohexane as a solvent and acetone as precipitator. The rubber (isolated as a solid) is dried in vacuum at 60° C. for 36 hours.

The practice of the process of this invention will be more apparent to those skilled in the art from the following Examples wherein, as elsewhere in this specification, all parts are parts by weight unless otherwise set forth. Control Examples are designated by an asterisk (*).

EXAMPLE 1

In this example an EPDM is modified by grafting isocyanatoethyl methacrylate (IEM) and capping 2-amino-2-thiazoline (2A-2T).

The isocyanatoethyl methacrylate is grafted onto EPM in the presence of a free radical initiator, dicumyl peroxide. EPM (Mn=80,000 as measured by SEC) containing approximately 60 mol % of ethylene is used.

100 g of EPM dissolved in 400 g of mineral grafting oil (SUN-148) is heated to 155° C. (with stirring under nitrogen). 4.0 g of IEM is added followed by 1.3 g of dicumyl peroxide dissolved in 3 g of oil. The mixture is stirred using above conditions for 2 hours.

3.0 g of 2A-2T mixed with 12 g of diluent oil is added and the mixture is stirred at room temperature for 2 hours.

Then, the solvent neutral oil (SNO-100) is added to give a solution containing 13.0 wt % polymer. This solution is used for further testing.

EXAMPLE 2

In this example an EPM is modified by grafting glycidyl methacrylate (GMA) and capping 2-amino-2-thiazoline (2A-2T).

The glycidyl methacrylate (GMA) is grafted onto an EPM in the presence of a free radical initiator, dicumyl peroxide. EPM (Mn=80,000 as measured by SEC) containing approximately 60 mol % of ethylene is used.

100 g of EPDM dissolved in 400 g of mineral grafting oil (SUN-148) is heated to 155° C. (with stirring under nitrogen). 4.0 g of GMA is added followed by 1.3 g of dicumyl peroxide dissolved in 3 g of oil. The mixture is stirred using the above conditions for 2 hours.

3.0 g of 2A-2T mixed with 12 g of diluent oil is added and the mixture is stirred at room temperature for 2 hours.

Then, the solvent neutral oil (SNO-100) is added to give a solution containing 13.0 wt % polymer. This solution is used for further testing.

EXAMPLE 3

100 g OF EPM which is used in Example 1, is added to 400 g of SUN-148 and 300 wt. parts of SNO-100. The mixture is heated to 155° C. with stirring and under nitrogen for 3 hours until the rubber is completely dissolved.

RESULTS

The evaluation data for the samples of Examples 1, 2 and 3 are listed below in Table II. The sample numbers are related to the Example numbers.

As shown below in Table II, samples of examples 1 and 2 containing a polymer with incorporated thiazoline units, show dispersant and antiwear activities. The reference sample of Example 3 containing an unmodified polymer shows neither dispersant nor antiwear activity.

The data below indicate that an olefin copolymer modified by incorporating an aminothiazoline from multifunctional VI improvers exhibits dispersant and antiwear performance in motor oils.

TABLE II

| SAMPLE | PROPERTIES OF SA | | |
|---|---|---|---|
| | 1 | 2 | 3* |
| MATERIAL | | | |
| EPM | 100 | 100 | 100 |
| IEM | 4.0 | — | — |
| GMA | — | 4.0 | — |
| 2A-2T | 4.0 | 4.0 | — |
| DICUP | 1.3 | 1.3 | — |
| Grafting oil | 331.8 | 331.8 | 331.8 |
| Diluent oil | 328.1 | 328.1 | 337.4 |
| BENCH DISPERSANCY BVE TEST | | | |
| Results | 81 | 150 | 190 |
| Standards | 31/38/85 | | |
| ANTIWEAR PROPERTIES | | | |
| Four Ball Test, mn | 0.66 | 0.45 | 1.7 |

We claim:

1. A graft polymer which comprises a carbon-carbon backbone polymer and graft polymerized thereon, under graft polymerization reaction conditions, in the presence of free radical initiator, a graft reactive monomer containing a carbon-carbon double bond and a reactive group wherein said graft reactive monomer is an unsaturated compound containing an epoxide, isocyanate, azlactone, aldehyde or chlorine group which after graft polymerization is reacted with a thiazoline derivative containing an amine group.

2. The graft polymer of claim 1 wherein said thiazoline derived is 2-amino-2-thiazoline.

3. A graft polymer containing a carbon-carbon backbone as claimed in claim 1 wherein said backbone polymer is a copolymer of ethylene-propylene or an ethylene-propylene-diene terpolymer.

4. The graft copolymer of claim 1, wherein the graft reactive monomer is
glycidyl methacrylate
allyl glycidyl ether
isocyanatoethyl methacrylate
croton aldehyde
vinyl azlactone or
vinyl benzyl chloride.

5. The graft copolymer of claim 1, wherein the thiazoline derivative is a compound of the formula:

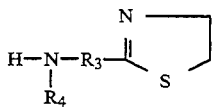

where:
$R_3$ is a linear, cyclic, heterocyclic or heteroaromatic group optionally containing one or more atom of oxygen, nitrogen, sulfur or phosphorus; and
$R_4$ is hydrogen or a linear, cyclic, heterocyclic or heteroaromatic group optionally containing one or more atom of oxygen, nitrogen, sulfur or phosphorous.

6. A lubricating oil composition comprising a major portion of lubricating oil and a minor effective viscosity index improving portion of a graft polymer containing a carbon-carbon backbone polymer and graft polymerized thereon, under graft polymerization reaction conditions, in the presence of free radical initiator, graft reactive monomer containing a carbon-carbon double bond and a reactive group wherein said graft reactive monomer is an unsaturated compound containing an epoxide, isocyanate, azlactone, aldehyde or chlorine group which after graft polymerization is reacted with a thiazoline derivative containing an amine group.

7. The lubricating oil composition of claim 6 wherein said thiazoline derivative is a 2-amino-2-thiazoline.

8. The lubricating oil composition of claim 6 wherein said backbone polymer is a copolymer of ethylene-propylene or a terpolymer of ethylene-propylene-diene.

9. The lubricating oil composition according to claim 6, wherein the graft reactive monomer is
glycidyl methacrylate
allyl glycidyl ether
isocyanatoethyl methacrylate
croton aldehyde
vinyl azlactone or
vinyl benzyl chloride.

10. The lubricating oil composition according to claim 6, wherein the thiazoline derivative is a compound of the formula

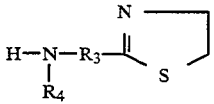

where:
$R_3$ is a linear, cyclic, heterocyclic or heteroaromatic group optionally containing one or more atom of oxygen, nitrogen, sulfur or phosphorus; and
$R_4$ is hydrogen or a linear, cyclic, heterocyclic or heteroaromatic group optionally containing one or more atom of oxygen, nitrogen, sulfur or phosphorous.

11. The lubricating oil of claim 6 wherein said minor effective viscosity index improving portion of said graft polymer is 0.1-20 wt % based on the oil composition.

* * * * *